(12) United States Patent
Zhang (10) Patent No.: US 10,306,713 B2
(45) Date of Patent: May 28, 2019

(54) RESERVE POWER AND CONTROL FOR LIGHT SOURCES IN A LIGHT FIXTURE

(71) Applicant: Cooper Technologies Company, Houston, TX (US)

(72) Inventor: Hui Zhang, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 146 days.

(21) Appl. No.: 15/436,219

(22) Filed: Feb. 17, 2017

(65) Prior Publication Data

US 2017/0245334 A1 Aug. 24, 2017

Related U.S. Application Data

(60) Provisional application No. 62/296,782, filed on Feb. 18, 2016.

(51) Int. Cl.
| | |
|---|---|
| *H02J 7/00* | (2006.01) |
| *H05B 33/08* | (2006.01) |
| *H02J 7/34* | (2006.01) |
| *H05B 37/02* | (2006.01) |

(52) U.S. Cl.
CPC ........ *H05B 33/0815* (2013.01); *H02J 7/0068* (2013.01); *H02J 7/345* (2013.01); *H05B 33/0821* (2013.01); *H05B 33/0824* (2013.01); *H05B 33/0842* (2013.01); *H05B 33/0845* (2013.01); *H05B 37/0227* (2013.01)

(58) Field of Classification Search
CPC .... B64D 47/06; H05B 33/08; H05B 33/0815; H05B 33/0821; H05B 33/0845; H05B 33/0824; H05B 33/0842; H05B 37/0227; H02J 7/00; H02J 7/0068; H02J 7/345

See application file for complete search history.

(56) References Cited

U.S. PATENT DOCUMENTS

| | | | | |
|---|---|---|---|---|
| 7,378,989 | B2 * | 5/2008 | Wisch | A62B 3/00 340/332 |
| 7,492,108 | B2 | 2/2009 | Garcia et al. | |
| 2010/0135000 | A1 | 6/2010 | Smith, III et al. | |
| 2011/0133655 | A1 | 6/2011 | Recker et al. | |
| 2011/0232143 | A1 | 9/2011 | Hsu | |
| 2013/0234595 | A1 | 9/2013 | Martin et al. | |
| 2014/0225511 | A1 | 8/2014 | Pickard et al. | |

OTHER PUBLICATIONS

S.Surikov, International Search Report and Written Opinion issued in application No. PCT/US2017/018416, completion date May 22, 2017, dated Jun. 1, 2017, 7 pages, Federal Institute of Industrial Property, Moscow, Russia.

\* cited by examiner

*Primary Examiner* — Robert L Deberadinis
(74) *Attorney, Agent, or Firm* — King & Spalding LLP (57) ABSTRACT

An electrical circuit for a light fixture can include a power supply that provides primary power. The electrical circuit can also include a light module having at least one first light source coupled to the power supply, where the at least one light source illuminates when the light module receives the primary power. The electrical circuit can further include an energy storage unit having at least one energy storage device, where the at least one energy storage device charges using the primary power. The at least one first light source can receive reserve power from the energy storage unit when the power supply ceases providing the primary power.

20 Claims, 8 Drawing Sheets

RESERVE POWER AND CONTROL FOR LIGHT SOURCES IN A LIGHT FIXTURE

CROSS-REFERENCE TO RELATED APPLICATIONS

This application claims priority under 35 U.S.C. § 119 to U.S. Provisional Patent Application Ser. No. 62/296,782, titled "Reserve Power and Control For Light Sources In a Light Fixture" and filed on Feb. 18, 2016, the entire contents of which are hereby incorporated herein by reference.

TECHNICAL FIELD

The present disclosure relates generally to lighting fixtures using light emitting diodes (LEDs) as the light source, and more particularly to providing reserve power and control to light sources within a LED light fixture.

BACKGROUND

In a number of applications, such as with emergency egress lighting, light sources from a light fixture must remain illuminated, even when there is a power outage. Typically, this emergency power is provided to the light sources by an energy storage unit having at least one energy storage device (e.g., a battery) that is charged using the same source of power that feeds the light fixture.

SUMMARY

In general, in one aspect, the disclosure relates to an electrical circuit for a light fixture. The electrical circuit can include a power supply that provides primary power, where the power supply comprises a rectifier. The electrical circuit can also include a light module having at least one first light source and coupled to the power supply, where the at least one light source illuminates when the light module receives the primary power. The electrical circuit can further include an energy storage unit having at least one energy storage device, where the at least one energy storage device charges using the primary power. The at least one first light source can receive reserve power from the energy storage unit when the power supply ceases providing the primary power.

In another aspect, the disclosure can generally relate to a lighting circuit. The lighting circuit can include a power source that provides main power. The lighting circuit can also include a driving circuit coupled to the power source, where the driving circuit receives the main power and produces primary power, where the driving circuit comprises a rectifier. The lighting circuit can further include at least one light source array coupled to the driving circuit, where the at least one light source array includes at least one first light source that illuminates using the primary power received from the driving circuit. The lighting circuit can also include an energy storage unit electrically coupled in parallel to the at least one light source array, where the energy storage unit includes at least one energy storage device, where the at least one energy storage device charges using the primary power. The at least one first light source array can receive reserve power from the energy storage unit when the driving circuit ceases providing the primary power.

These and other aspects, objects, features, and embodiments will be apparent from the following description and the appended claims.

BRIEF DESCRIPTION OF THE DRAWINGS

The drawings illustrate only example embodiments of reserve power and control of light sources for a light fixture and are therefore not to be considered limiting of its scope, as reserve power and control of light sources for a light fixture may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of reserve power and control for light sources in a light fixture. While the light sources are described herein as light-emitting diodes (LEDs), one or more other types of light sources (e.g., incandescent, fluorescent, halogen, sodium vapor) can be used with example embodiments. Further, while example embodiments are directed for use with light fixtures, any other type of device that includes light sources can be used with example embodiments.

When a light source described herein uses LED technology, the light source may include one or more of a number of different types of LED technology. For example, each LED light source (also called LEDs) may be packaged or fabricated on a printed circuit board and/or with chip-on-board technology. Further, the number of LEDs used in various embodiments may be more or fewer than the number of LEDs in the example embodiments described herein. The number of LEDs used may depend on one or more of a number of factors including, but not limited to, the voltage drops of the LEDs selected and the voltage levels of the power source voltages used (e.g., 120 VAC, 240 VAC, 277 VAC). One or more example embodiments may be used with a LED lighting circuit that is dimmable. The number of LEDs used in a light fixture can relate to a desired lumen output. Further, the number of LEDs that are illuminated using reserve power (provided by an example energy storage unit, described below) can differ from the number of LEDs illuminated using a power supply (also described below).

As described herein, a user can be any person that interacts with example lighting circuits. Examples of a user may include, but are not limited to, a consumer, an electrician, an engineer, a mechanic, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In certain example embodiments, the systems (or portions thereof) that include example reserve power and control for light sources in a light fixture described herein meet one or more of a number of standards, codes, regulations, and/or other requirements established and maintained by one or more entities. Examples of such entities include, but are not limited to, Underwriters' Laboratories (UL), the National Electric Code (NEC), the Institute of Electrical and Electronics Engineers (IEEE), and the National Fire Protection Association (NFPA). For example, wiring (the wire itself and/or the installation of such wire) that electrically couples an example energy storage unit (defined below) with a device or component may fall within one or more standards set forth in the NEC. Specifically, the NEC defines Class 1 circuits and Class 2 circuits under various Articles, depending on the application of use. Example embodiments can be used in either Class 1 or Class 2 circuits.

Example embodiments of reserve power and control for light sources in a light fixture will be described more fully hereinafter with reference to the accompanying drawings, in which example embodiments of reserve power and control for light sources in a light fixture are shown. Reserve power and control for light sources in a light fixture may, however, be embodied in many different forms and should not be construed as limited to the example embodiments set forth herein. Rather, these example embodiments are provided so that this disclosure will be thorough and complete, and will fully convey the scope of reserve power and control for light sources in a light fixture to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation, and are not meant to limit embodiments of reserve power and control for light sources in a light fixture. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
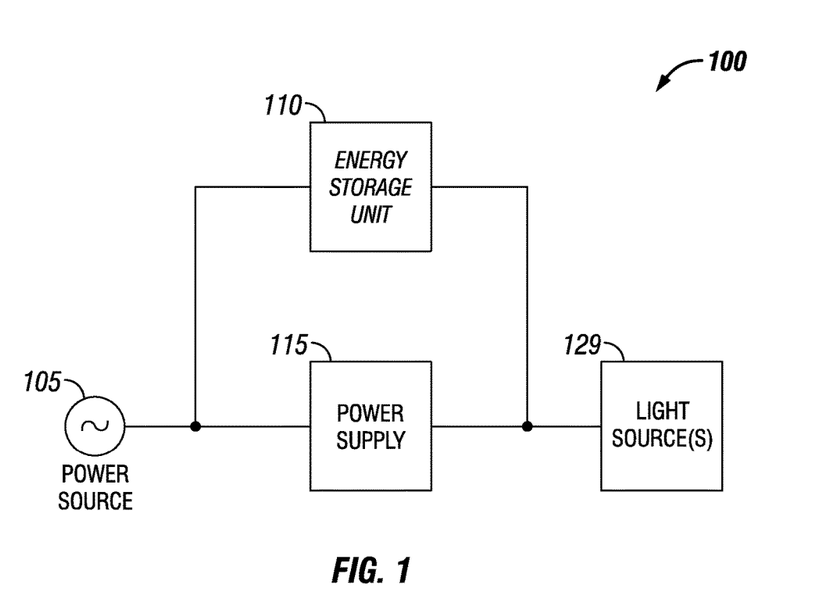
FIG. 1 shows a lighting circuit with an emergency battery pack currently used in the art.

FIG. 1 shows a lighting circuit 100 currently used in the art. The lighting circuit 100 of FIG. 1, includes a power source 105, an energy storage unit 110 (also called, for example, an emergency battery pack 110), a power supply 115, and a light module 129. The power source 105 provides alternating current (AC) power. The power provided by the power source 105 can be called main power. The main power provided by the power source 105 is sent to both the energy storage unit 110 and the power supply 115, which are electrically connected in parallel to each other with respect to the power source 105. The main power provided by the power source 105 can have any voltage and/or current suitable to ultimately operate the light module 129 of the lighting circuit 100. For example, the power source 105 may provide 120 $V_{rms}$ (root-mean-square) source commonly found in residential and commercial buildings. As another example, the power source 105 may provide 24 $V_{rms}$ source obtained through a transformer that converts voltage and provides isolation.

The energy storage unit 110 provides reserve power to the light module 129 when the main power provided by the power source 105 is interrupted. The energy storage unit 110 includes an AC-to-direct current (DC) converter, typically two DC-to-DC converters, one or more batteries, and a controller. The AC-to-DC converter is required to covert the main power into a type of power (DC). The first DC-to-DC converter is coupled to the output of the AC-to-DC converter and generates DC power that can be used by the batteries. When power is released by the batteries, the second DC-to-DC converter receives that power and coverts it into the reserve power that can be used directly by the light module 129. The batteries of the energy storage unit 110 receive the main power provided by the power source 105 (after that main power goes through the AC-to-DC converter and the first DC-to-DC converter) and stores that power. The controller of the energy storage unit 110 determines when the reserve power stored in the batteries should be released (after going through the second DC-to-DC converter) to the light module 129. More details of the batteries (also generically called energy storage devices) and the controller, as they apply to the example energy storage units described herein, are provided below with respect to FIGS. 2A-7.

The power supply 115 receives the main power provided by the power source 105, and changes (e.g., rectifies, transforms, converts, inverts) the characteristics (e.g., type, level) of that main power into primary power, which can be used by the light module 129. In other words, the power supply 115 converts the main (AC) power into primary (DC) power, which is suitable for use by the light module 129. In many cases, the power supply 115 is a full wave rectifier that converts sinusoidal AC from the power source 105 to a rectified AC supply or DC supply having a constant polarity. The rectifier can also be a half-wave rectifier. The power supply 115 can be a configuration of multiple diodes (as shown, for example, in FIG. 3), a semiconductor, a transformer, or any other suitable component or set of components.

Figure 2A:
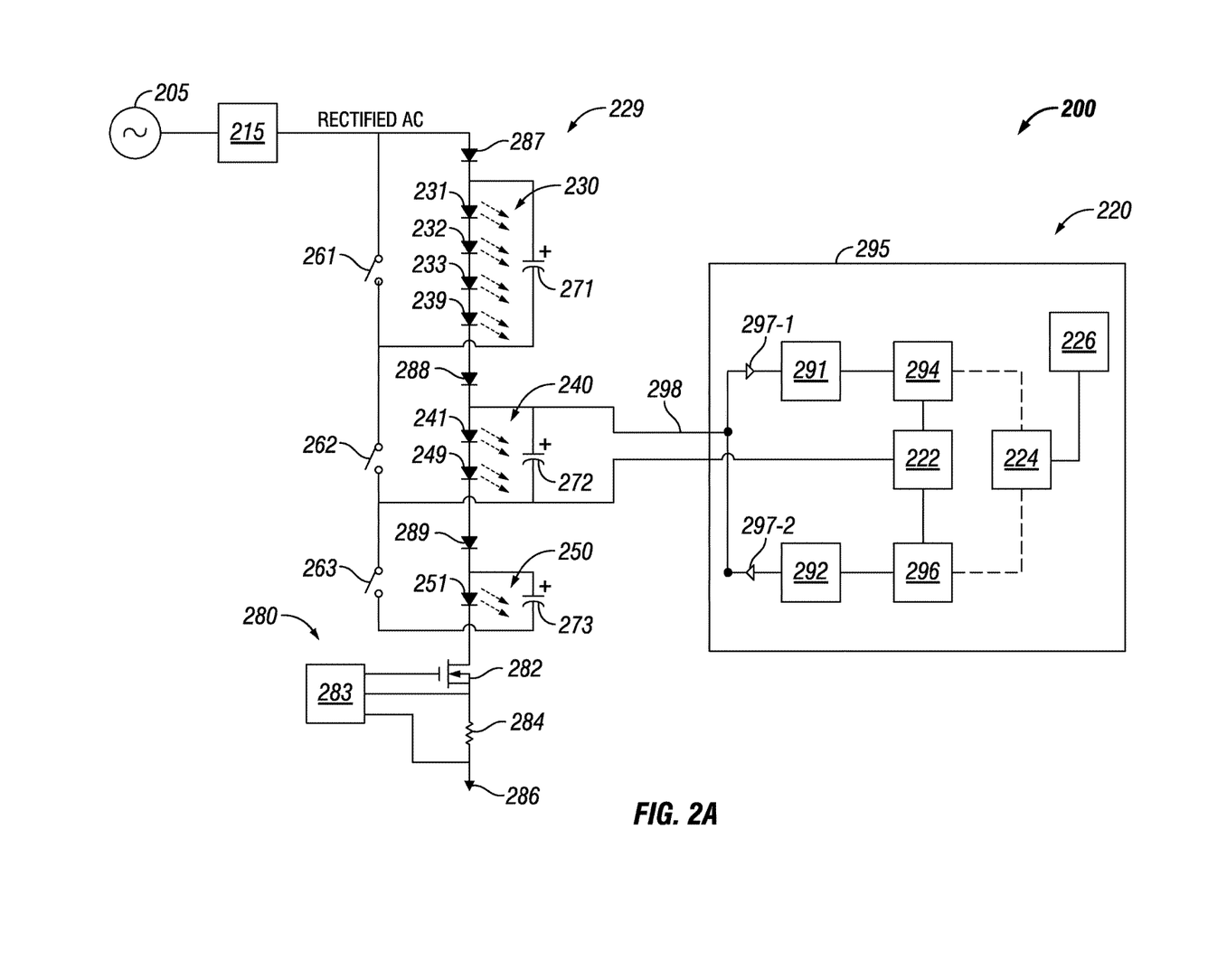
FIG. 2A shows a lighting circuit in accordance with one or more example embodiments.
Figure 2B:
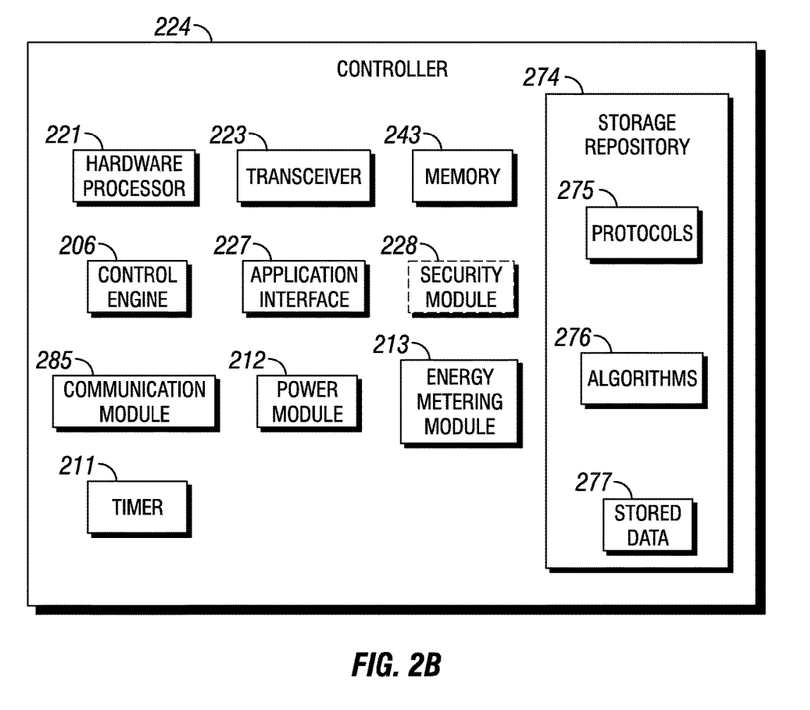
FIG. 2B shows a system diagram of a controller for the lighting system of FIG. 2A in accordance with certain example embodiments.

FIG. 2A shows a system diagram of a lighting circuit 200 in accordance with certain example embodiments. FIG. 2B shows a system diagram of a controller 224 for the energy storage unit 220 of FIG. 2A in accordance with certain example embodiments. Unlike the lighting circuit 100 of FIG. 1, the lighting circuit 200 of FIG. 2A has an energy storage unit 220 that is connected downstream of the rectifier 215. In other words, the energy storage unit 220 charges using DC power, eliminating the need for the energy storage unit 220 to include an energy transfer device (in the current art, an AC-to-DC converter). The power source 205 and the rectifier 215 of FIG. 2A can be substantially the same as the power source 105 and the power supply 115 of FIG. 1. The primary power provided by the rectifier 215 is used by the light module 229.

Referring to FIGS. 1-2B, in certain example embodiments, the light module 229 includes one or more of a number of light source arrays. For example, as shown in FIG. 2A, the light module 229 has light source array 230, light source array 240, and light source array 250. A light source array of the light module 229 of FIG. 2A can include one or more individual light sources. For example, light source array 230 of the light module 229 of FIG. 2 can include light source 231, light source 232, light source 233, and light source 239. As another example, light source array 240 of the light module 229 of FIG. 2A can include light source 241 and light source 249. As yet another example, light source array 250 of the light module 229 of FIG. 2A can include light source 251.

When a light source array includes multiple light sources, one light source within that light source array can be coupled in series and/or in parallel with the remainder of the light sources in the light source array. For example, light source 231, light source 232, light source 233, and light source 239 of light source array 230 in FIG. 2A are arranged in series. Similarly, light source 241 and light source 249 of light source array 240 in FIG. 2A are coupled in series. In addition, or in the alternative, when a light module 229 includes multiple light source arrays, one light source array can be coupled in series and/or in parallel with the remainder of the light source arrays. For example, as shown in FIG. 2A, light source array 230, light source array 240, and light source array 250 are coupled in series.

A light source of the light module 229 can illuminate when receiving primary power from the rectifier 215 or reserve power from the energy storage unit 220. A light source can use or be any of a number of lighting technologies, including but not limited to a light-emitting diode, halogen, sodium vapor, and incandescent. Also, a light source can emit light in one or more of any number of colors, including but not limited to white, red, green, blue, violet, and yellow.

One or more of a number of other components can be coupled to each light source array within a light module. For example, as shown in the lighting circuit 200 of FIG. 2A, each light source array is coupled to a diode, a capacitor, and a switch. Specifically, in this case, light source array 230 is coupled in series with diode 287 and in parallel with switch 261 and capacitor 271. In addition, light source array 240 is coupled in series with diode 288 and in parallel with switch 262 and capacitor 272. Further, light source array 250 is coupled in series with diode 289 and in parallel with switch 263 and capacitor 273. If a light source array (e.g., light source array 240) is designed to include a capacitor (e.g., capacitor 272), then in certain example embodiments, the energy storage unit 220 can be used to replace such capacitor and provide the stored and discharged energy needs of the light source array.

If a light source array is coupled to a switch, the switch can be used to electrically isolate the light source array from (when the switch is in one position (closed or open)) and/or connect the light source array to (when the switch is in another position (open or closed)) the rest of the light module 229. A switch can be a semiconductor (e.g., a MOSFET) or any other suitable switching device. In many cases, the switches shown in FIG. 2A operate on a very short time frame (e.g., one millisecond).

The lighting circuit 200 can also include one or more components that are coupled to the light module 229. For example, as shown in FIG. 2A, the light module 229 can be coupled to a current regulator 280, which includes one or more of a number of components. In this case, the current regulator 280 includes a transistor 282, a control circuit 283, a resistor 284. Further, at least a portion of the lighting circuit 200 can be coupled to electrical ground 286. For example, the control circuit 283 and the resistor 284 of the current regulator 280 can be directly coupled to electrical ground 286. The control circuit 283 can be or include an integrated circuit and/or one or more of a number of discrete components. The control circuit 283 is configured to control the transistor 282 based on the voltage across the resistor 284. By controlling the transistor 282, the control circuit 283 controls the amount of current that flows through the light module 229. In some cases, the control circuit 283 can control one or more switches (e.g., switch 261, switch 262, switch 263).

In some cases, the rectifier 215, the current regulator 280, the switches (in this case, switch 261, switch 262, and switch 263), and the capacitors (in this case, capacitor 271, capacitor 272, and capacitor 273) can be considered part of a driving circuit. As shown below, a lighting circuit can be without some of these components (e.g., switches, capacitors, diodes). In any case, the driving circuit receives the main power from the power source 205, manipulates the main power, and uses the resulting primary power to illuminate and control the light module 229.

In certain example embodiments, an example energy storage unit 220 can be coupled in parallel with one or more of a number of light source arrays (or portions thereof) of a light module. For example, in this case, the energy storage unit 220 of FIG. 2A is coupled in parallel with light source array 240 of the light module 229. As discussed above, in certain example embodiments, the energy storage unit 220 includes one or more of a number of components. For example, as shown in FIG. 2A, the energy storage unit 220 can include at least one energy storage device 222, one or more switches (e.g., switch 294, switch 296), a DC-DC converter 291, a boost converter 292, one or more diodes 297, at least one controller 224, and at least one sensor device 226. Some or all of these components of the energy storage unit 220 can be located within an optional housing 295 of the energy storage unit 220.

The DC-DC converter 291 can be called by any of a number of other names, including but not limited to a non-isolated DC-DC constant voltage constant current converter 291 and a non-isolated charger stage 291. In this example, the DC-DC converter 291 manipulates (in this case, converts) the DC primary power received at the terminals 298 into a voltage of the type (in this case, DC) and level (e.g., 24V, 12V) used by the energy storage devices 222. The DC-DC converter 291 of the energy storage unit 220 can include one or more of a number of single or multiple discrete components (e.g., transistor, diode, resistor), and/or a microprocessor. The DC-DC converter 291 may include a printed circuit board, upon which the microprocessor and/or one or more discrete components are positioned.

The boost converter 292 can be called by any of a number of other names, including but not limited to a boost stage 292. In certain example embodiments, the boost converter 292 manipulates (in this case, boosts) the DC reserve LV power released by the energy storage devices 222 into a voltage of the type (in this case, DC) and level used by at least a portion of the light module 229. The boost converter 292 can include one or more of a number of single or multiple discrete components (e.g., transistor, diode, resistor), and/or a microprocessor. The boost converter 292 may include a printed circuit board, upon which the microprocessor and/or one or more discrete components are positioned.

Figure 6:
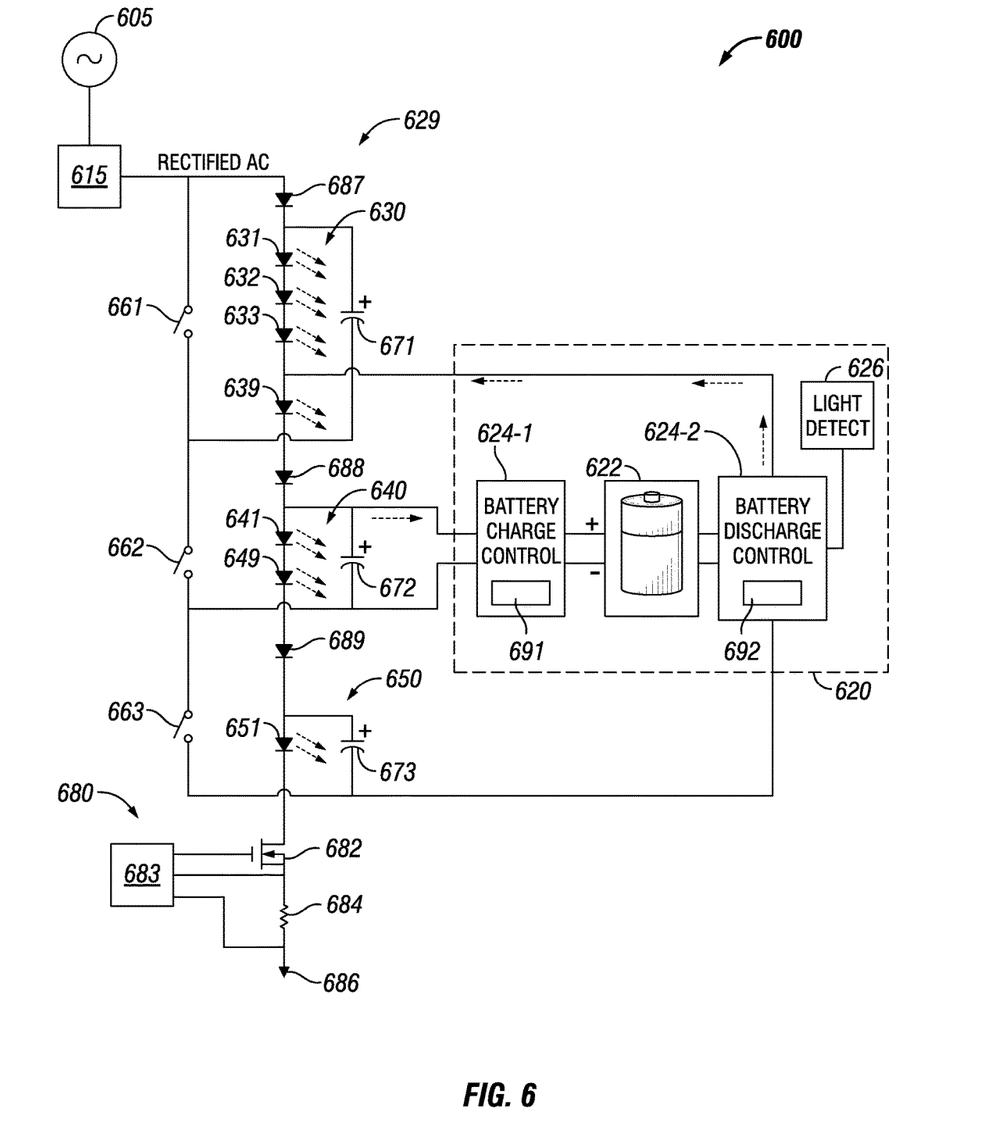

In certain example embodiments, the energy storage unit 220 includes only a single converter, thereby combining the DC-DC converter 291 and the boost converter 292. In such a case, the single DC-to-DC converter is bidirectional. In other words, the DC-to-DC converter can receive the primary power from the light module 229 and convert the primary power into a level of DC power that can be stored by the energy storage devices 222. In addition, the DC-to-DC converter can receive the reserve power stored in the energy storage devices 222 and converts that power into a level of DC reserve power that can be used by one or more portions of the light module 229. FIG. 6 below shows another example where the controller of an example energy storage unit has two DC-to-DC converters (a DC-DC converter 691 and a boost converter 692).

Switch 294 is used to channel primary power (as received, for example, from a portion of the light module 229) to the energy storage devices 222 when the energy storage devices 222 need charging. Switch 294 can be any type of device (e.g., transistor, dipole switch, relay contacts) that can open and close (change state or change position) based on certain conditions. For example, switch 294 can close when primary power is received at terminal 298, and can open when primary power is interrupted at input terminal 298. In certain example embodiments, as shown in FIG. 2A, the switch 294 can operate (e.g., change from a closed position to an open position, change from an open position to a closed position) based on input from the controller 224. As an example, for an initial period of time (e.g., until the energy storage devices 222 are charged to some amount (e.g., 99%) of capacity), switch 294 remains closed, and thereafter switch 294 will change state (e.g., become open) until the storage level of the energy storage devices 222 drops to some lesser amount (e.g., 50%) of capacity, provided that the primary power is still being delivered to the terminal 298 of the energy storage unit 220. As another example, the switch 294 can become (or remain) open for as long as delivery of the primary power to the terminal 298 of the energy storage unit 220 is interrupted.

An energy storage device 222 can be one or more of any rechargeable devices (e.g., batteries, supercapacitors) that are configured to charge using the primary power. In some cases, one or more of the energy storage devices 222 charge using a different level and/or type of power relative to the level and type of power of the primary power. In such a case, as described below, the energy storage unit 220 (or a portion thereof, such as the controller 224) can include the DC-DC converter 291 to convert the primary power to the level of power used to charge the energy storage devices 222. There can be any number of energy storage devices 222 in an energy storage unit 220. The energy storage devices 222 can use one or more of any number of storage technologies. Examples of such technologies can include, but are not limited to, nickel-cadmium, nickel-metalhydride, lithium-ion, and alkaline.

Switch 296 can be used to control the flow of the reserve power discharged by the energy storage devices 222 to the light module 229. In certain example embodiments, switch 296 is open during certain times (e.g., when the amount of charge in the energy storage devices 222 falls below a threshold value, when the primary power is received by the light module 229, thereby preventing the energy storage devices 222 from discharging. In addition, switch 296 is closed during other times (e.g., when primary power is interrupted and not received at the terminal 298, when the amount of charge in the energy storage devices is above a threshold value), thereby allowing the energy storage devices 222 to discharge the reserve power to the light load 229. Switch 296 can be any type of device (e.g., transistor, dipole switch, relay contacts) that changes state based on certain conditions. Switch 296 can be the same as, or different than, switch 294. In certain example embodiments, the switch 296 can operate (e.g., change from a closed position to an open position, change from an open position to a closed position) based on input from the controller 224.

In this example, the energy storage unit 220 includes two diodes 297. As shown in FIG. 2A, one diode 297-1 is disposed between the terminal 298 and the DC-DC converter 291. This diode 297-1 allows the flow of primary power from the terminal 298 and the DC-DC converter 291, and prevents the flow of power in the opposite direction. The other diode 297-2 of FIG. 2A is disposed between the terminal 298 and the boost converter 292. This diode 297-2 allows the flow of reserve power from the DC-DC converter 291 to the terminal 298, and prevents the flow of power in the opposite direction. In some cases, one or more other components (e.g., switches, transistors) can be used as an alternative to the diodes 297 of FIG. 2A.

The sensor device 226 (also more simply called a sensor) can measure one or more parameters within the lighting circuit 200 and/or in the ambient environment (outside of the lighting circuit 200). The sensor device 226 can measure a parameter continuously, periodically, based on the occurrence of an event, based on a command received from the controller 224, randomly, and/or based on some other factor. The parameter measured by the sensor device 226 can be used to determine whether the primary power provided by the rectifier 215 is reaching the light module 229. For example, the sensor device 226 can be a photosensor that detects an amount of light emitted by one or more light sources of the light module 229. As another example, the sensor device 226 can be an energy metering device that measures an amount of primary power (e.g., voltage, current, watts) at the output terminal of the rectifier 215.

In some cases, the sensor device 226 can measure one or more parameters that are not directly related to the availability of primary power. For example, the sensor device 226 can be an energy metering device that measures the amount of charge in the energy storage devices 222. Other parameters that can be measured by a sensor device 226 can include, but are not limited to, a temperature, a pressure, presence of smoke, movement, an amount of ambient light, and vibration. In some cases, the sensor device 226 can be a resistor that generates a signal if there is current flowing through the resistor and/or a voltage across the resistor.

In certain example embodiments, as shown in FIG. 2B, the controller 224 can include one or more of a number of components. Examples of such components can include, but are not limited to, a control engine 206, a communication module 285, a timer 211, a power module 212, an energy metering module 213, a storage repository 274, a hardware processor 221, a memory 243, a transceiver 223, an application interface 227, and an optional security module 228. The controller 224 can correspond to a computer system 718 as described below with regard to FIG. 7.

The components shown in FIG. 2B are not exhaustive, and in some embodiments, one or more of the components shown in FIG. 2B may not be included in an example controller 224. Any component of the example controller 224 can be discrete or combined with one or more other components of the controller 224. In addition, the inclusion and/or location of one or more components can vary from what is shown in FIG. 2B. As an example, one or more of the switches (e.g., switch 296) can be part of the controller 224.

In certain example embodiments, the controller 224 performs a number of functions. For example, the controller 224 can communicate with (e.g., send instructions to, receive measurements from) the sensor device 226. In such a case, the controller 224 can determine whether the primary power provided by the rectifier 215 is being delivered to the light module 229 at a given point in time. If not, then the controller 224 can control one or more switches (e.g., switch 294, switch 296) to release the reserve power from one or more of the energy storage devices 222 to one or more portions of the light module 229. If so, then the controller 224 can control one or more switches (e.g., switch 294, switch 296) to prevent the reserve power from one or more of the energy storage devices 222 from flowing to one or more portions of the light module 229.

As another example, the controller 224 can determine the extent to which the energy storage devices 222 are charged. In such a case, the energy storage unit 220 can include a sensor device 226 that measures the amount of charge in one or more of the energy storage devices 222. The controller 224 can receive the measurements of such sensor device and determine whether the storage level of one or more energy storage devices 222 is within a range of charge. If the amount of charge falls below the lower end of the range (a lower threshold), then the controller 224 can control one or more switches (e.g., switch 294, switch 296) to allow primary power to charge the energy storage device 222. Alternatively, if the amount of charge is higher than the upper end of the range (an upper threshold), then the controller 224 can control one or more switches (e.g., switch 294, switch 296) to prevent primary power from charging the energy storage device 222.

In certain example embodiments, the controller 224 can control (for example, using one or more switches (e.g., switch 261, switch 262, switch 263) in the lighting circuit 200, based on default settings, based on a measurement of a sensor device 226) which particular light source arrays (or which particular light sources within a light source array) can be illuminated using the reserve power provided by the energy storage unit 220. The controller 224 can also control one or more characteristics (e.g., the mode of operation (e.g., flashing, constant on)) of a light source, reduced or increased power levels (relative to the primary power) delivered to a light source, color emitted by a light source, particular light sources receiving reserve power, intensity of light emitted by a light source receiving reserve power) using reserve power. In some cases, the controller 224 can communicate with another controller of another lighting circuit in a system and/or with a network manager. In such a case, the controller 224 can operate (e.g., provide reserve power, select particular light sources to receive the reserve power) based on instructions received from the other controller and/or network manager.

In certain example embodiments, the controller 224 of the energy storage unit 220 can perform self-testing functions (e.g., perform a monthly check on the functionality of one or more of the energy storage devices 222, perform a diagnostic evaluation of one or more components of the energy storage unit (e.g., the sensor device 226)). In such a case, the results of these tests can be communicated by the controller 224 to a user, to a network manager, to another controller of that light fixture, to a controller of another light fixture, to a regulatory entity, and/or to some other entity with an interest in such information. The controller 224 can be autonomous, self-learning, reporting, controlled by a user, controlled by a network manager, and/or operate in any of a number of other modes.

In addition to (or in the alternative of) the presence of primary power, the controller 224 of the energy storage unit 220 can distribute reserve power from the energy storage devices 222 to one or more specific light sources of the light module 229 based on one or more of a number of other factors. Such other factors can include, but are not limited to, the time of day, the duration of an outage, a specific problem detected by the sensor device 226, and the location in which a parameter is measured by the sensor device 226.

When the controller 224 of the energy storage unit 220 releases reserve power from one or more of the energy storage devices 222, the reserve power can be delivered to some or all of the light sources within the light module 229. For example, as shown in FIG. 2A, the reserve power can be delivered to light source array 240, thereby illuminating light source 241 and light source 249. Depending on the position (e.g., open, closed) of the one or more switches (e.g., switch 296) located downstream of where the reserve power is delivered to the light module 229, one or more other light source arrays (or light sources within a light source array) can also be illuminated by the reserve power. As discussed above, the controller 224 of the energy storage unit 220 can dictate the position of any of such switches (e.g., switch 294, switch 296) in the lighting circuit 200.

The energy metering module 213 of the controller 224 can be considered a type of sensor device 226 that monitors conditions within the controller 224. Examples of such conditions can include, but are not limited to, power received by the power module 212, power delivered by the power module 212, and speed of the hardware processor 221. The energy metering module 213 of the controller 224 measures one or more components of power (e.g., current, voltage, resistance, VARs, watts) associated with the controller 224. The energy metering module 213 can include any of a number of measuring devices and related devices, including but not limited to a voltmeter, an ammeter, a resistor, a power meter, an ohmmeter, a current transformer, a potential transformer, and electrical wiring. The energy metering module 213 can measure a component of power continuously, periodically, based on the occurrence of an event, based on a command received from the control engine 206, randomly, and/or based on some other factor. The energy metering module 213 and/or other components of the controller 224 can receive power, control, and/or communication signals from the primary power, reserve power, and/or the power module 212.

The controller 224 of the energy storage unit 220 can interact (e.g., periodically, continually, randomly) with any one or more components (e.g., control circuit 283) within the lighting circuit 200 and/or one or more components (e.g., a user, a network manager) outside the lighting circuit 200. The controller 224 can interact with such other components using the application interface 227 in accordance with one or more example embodiments. Specifically, the application interface 227 of the controller 224 receives data (e.g., information, communications, instructions) from and sends data (e.g., information, communications, instructions) to the other components of the system.

The controller 224, a switch, a sensor device 226, a user, and/or any other component within the lighting circuit 200 or outside of the lighting circuit 200 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 224. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 7.

Further, as discussed above, such a system can have corresponding software (e.g., user software, controller software, LV device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system.

The controller 224 can include a housing. The housing can include at least one wall that forms a cavity. The housing of the controller 224 can be used to house, at least in part, one or more components (e.g., power module 212, energy metering module 213) of the controller 224. For example, the controller 224 (which in this case includes the control engine 206, the communication module 285, the timer 211, the storage repository 274, the hardware processor 221, the memory 243, the transceiver 223, the application interface 227, and the optional security module 228) can be disposed within the cavity formed by a housing. In alternative embodiments, any one or more of these or other components of the controller 224 can be disposed on a housing and/or remotely from a housing.

The storage repository 274 can be a persistent storage device (or set of devices) that stores software and data used to assist the controller 224 in communicating with one or more other components of the system. In one or more example embodiments, the storage repository 274 stores protocols 275, algorithms 276, and stored data 277. The protocols 275 can be any procedures (e.g., a series of method steps) and/or other similar operational procedures that the control engine 206 of the controller 224 follows based on certain conditions at a point in time. The protocols 275 can include any of a number of communication protocols 275 that are used to send and/or receive data between the controller 224 and one or more components within and/or outside the lighting circuit 200.

A protocol 275 can be used for wired and/or wireless communication. Examples of a protocol 275 can include, but are not limited to, Modbus, profibus, Ethernet, and fiberoptic. One or more of the communication protocols 275 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 275 can provide a layer of security to the data transferred within the lighting circuit 200.

The algorithms 276 can be any formulas, logic steps, mathematical models (e.g., load forecasting models, forward energy price model), and/or other suitable means of manipulating and/or processing data. One or more algorithms 276 can be used for a particular protocol 275. As discussed above, the controller 224 controls one or more of the switches 170 in certain example embodiments. The controller 224 can base its control of a switch (e.g., switch 294, switch 263) using a protocol 275, an algorithm 276, and/or stored data 277. For example, a protocol 275 can dictate the length of a period of time (e.g., measured by the timer 211) where primary power is delivered to the energy storage devices 222.

As another example, an algorithm 276 can be used, in conjunction with measurements made by one or more sensor devices 226, to determine how often one or more switches (e.g., switch 296) are operated. As yet another example, an algorithm 276 can be used in optimizing the range of charge in the energy storage devices 222 to maximize the useful life of the energy storage devices 222.

Stored data 277 can be any data associated with the lighting circuit 200 (including any components thereof), any measurements taken by the sensor devices 226, time measured by the timer 211, threshold values, current ratings for the energy storage devices 222, results of previously run or calculated algorithms 276, and/or any other suitable data. Such data can be any type of data, including but not limited to historical data for the lighting circuit 200 (including any components thereof, such as the energy storage devices 222), historical data for other energy storage devices not part of the lighting circuit 200, calculations, and measurements taken by one or more sensors 226. The stored data 277 can be associated with some measurement of time derived, for example, from the timer 211.

Examples of a storage repository 274 can include, but are not limited to, a database (or a number of databases), a file system, a hard drive, flash memory, some other form of solid state data storage, or any suitable combination thereof. The storage repository 274 can be located on multiple physical machines, each storing all or a portion of the protocols 275, algorithms 276, and/or stored date 277 according to some example embodiments. Each storage unit or device can be physically located in the same or in a different geographic location.

The storage repository 274 can be operatively connected to the control engine 206. In one or more example embodiments, the control engine 206 includes functionality to one or more other components in the system. More specifically, the control engine 206 sends information to and/or receives information from the storage repository 274 in order to communicate with one or more other components in the system. As discussed below, the storage repository 274 can also be operatively connected to the communication module 285 in certain example embodiments.

In certain example embodiments, the control engine 206 of the controller 224 compares the readings made by the energy metering module 213 with threshold values, operates one or more switches (e.g., switch 294, switch 296), controls the charging of the energy storage devices 222, and releases reserve power from the energy storage devices 222 to the light module 229. The control engine 206 of the controller 224 can manage the light module 229 (e.g., using switch 261, switch 262, and switch 263) being served by the energy storage unit 220 so that the reserve LV signals generated by the energy storage devices 222 of the energy storage unit 220 is provided to the light module 229 efficiently, particularly during extended outage periods when the primary power is unavailable.

In certain example embodiments, the control engine 206 of the controller 224 controls the operation of one or more components (e.g., the communication module 285, the transceiver 223) of the controller 224. For example, the control engine 206 can put the communication module 285 in "sleep" mode when there are no communications between the controller 224 and another component in the lighting circuit 200 or when communications between the controller 224 and another component in the lighting circuit 200 follow a regular pattern. In such a case, power consumed by the controller 224 is conserved by only enabling the communication module 285 when the communication module 285 is needed.

The control engine 206 can provide control, communication, and/or other similar signals to one or more other components of the lighting circuit 200. Similarly, the control engine 206 can receive control, communication, and/or other similar signals from one or more other components of (or in some cases outside) the lighting circuit 200. The control engine 206 can control the energy storage unit 220 or portions thereof (e.g., the DC-DC converter 291, the boost converter 292) automatically (for example, based on one or more algorithms 276 stored in the storage repository 274) and/or based on control, communication, and/or other similar signals received from a controller of another component of the lighting circuit 200. The control engine 206 may include a printed circuit board, upon which the hardware processor 221 and/or one or more discrete components of the controller 224 can be positioned.

In certain example embodiments, the control engine 206 can include an interface that enables the control engine 206 to communicate with one or more components (e.g., communication module 285) of the controller 224 and/or another component of the lighting circuit 200. For example, if the energy storage unit 220 operates under IEC Standard 62386, then the terminal 298 can include a digital addressable lighting interface (DALI). In such a case, the control engine 206 can also include a DALI to enable communication with the terminal 298 within the energy storage unit 220. Such an interface can operate in conjunction with, or independently of, the communication protocols used to communicate between the controller 224 and another component of the system.

The control engine 206 can operate in real time. In other words, the control engine 206 of the controller 224 can process, send, and/or receive communications with another component of the lighting circuit 200 as any changes (e.g., discrete, continuous) occur within the system. Further, the control engine 206 of the controller 224 can, at substantially the same time, control the energy storage unit 220 and/or one or more other components in the system based on such changes.

In addition, the control engine 206 of the controller 224 can perform one or more of its functions continuously. For example, the control engine 206 can operate one or more of the switches (e.g., switch 294) based on measurements taken by the energy metering module 213.

In some cases, rather than operating a switch (e.g., switch 296), or in addition to operating a switch, the controller 224 can control the boost converter 292 and/or the DC-Dc converter 291. In other words, as an example, to reduce the amount of primary power fed to the energy storage devices 222, the control engine 206 can adjust the DC-DC converter 291 accordingly. As another example, the control engine 206 can send a control signal to a switch (e.g., switch 263) to add or eliminate load in the light module 229, thereby changing the amount of reserve power required the light module 229 from the energy storage unit 220.

In certain example embodiments, the control engine 206 of the controller 224 can operate (e.g., in real time) based on instructions received from a user, a change in primary power received by the energy storage unit 220, based on efficiency of the energy storage devices 222, and/or based on some other factor. In addition, the control engine 206 (or other portion of the controller 224) can include the timer 211. In such a case, the timer 211 can measure one or more elements of time, including but not limited to clock time and periods of time. The timer 211 can also include a calendar in addition to clock functions.

The control engine 206 (or other components of the controller 224) can also include one or more hardware and/or software architecture components to perform its functions. Such components can include, but are not limited to, a universal asynchronous receiver/transmitter (UART), a universal synchronous receiver/transmitter (USRT), a serial peripheral interface (SPI), a direct-attached capacity (DAC) storage device, an analog-to-digital converter, an inter-integrated circuit ($I^2C$), and a pulse width modulator (PWM).

In certain example embodiments, the communication module 285 of the controller 224 determines and implements the communication protocol (e.g., from the protocols 275 of the storage repository 274) that is used when the control engine 206 communicates with (e.g., sends signals to, receives signals from) another component in the lighting circuit 200. In some cases, the communication module 285 accesses the protocols 275 to determine which communication protocol is within the capability of the recipient of a communication sent by the control engine 206. In addition, the communication module 285 can interpret the communication protocol of a communication received by the controller 224 so that the control engine 206 can interpret the communication.

The communication module 285 can send data directly to and/or retrieve data directly from the storage repository 274. Alternatively, the control engine 206 can facilitate the transfer of data between the communication module 285 and the storage repository 274. The communication module 285 can also provide encryption to data that is sent by the controller 224 and decryption to data that is received by the controller 224. The communication module 285 can also provide one or more of a number of other services with respect to data sent from and received by the controller 224. Such services can include, but are not limited to, data packet routing information and procedures to follow in the event of data interruption.

The power module 212 of the controller 224 provides power to one or more other components (e.g., timer 211, control engine 206) of the controller 224. In certain example embodiments, the power module 212 receives primary power and or reserve power to operate. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212, The power module 212 can include one or more components (e.g., a transformer, a diode bridge, an inverter, a converter) that receives power (for example, through an electrical cable) from a source (e.g., the rectifier 215, the energy storage devices 222) and generates power of a type (e.g., alternating current, direct current) and level (e.g., 12V, 24V, 470V) that can be used by the other components of the controller 224. The power module 212 can use a closed control loop to maintain a preconfigured voltage or current with a tight tolerance at the output. The power module 212 can also protect the rest of the electronics (e.g., hardware processor 221, transceiver 223) from surges generated in the line. In addition, or in the alternative, the power module 212 can be a source of power in itself to provide signals to the other components of the controller 224. For example, the power module 212 can be or include a battery. As another example, the power module 212 can be a localized photovoltaic power system.

The hardware processor 221 of the controller 224 executes software in accordance with one or more example embodiments. Specifically, the hardware processor 221 can execute software on the control engine 206 or any other portion of the controller 224, as well as software used by any other component of the lighting circuit 200. The hardware processor 221 can be an integrated circuit, a central processing unit, a multi-core processing chip, a multi-chip module including multiple multi-core processing chips, or other hardware processor in one or more example embodiments. The hardware processor 221 is known by other names, including but not limited to a computer processor, a microprocessor, and a multi-core processor.

In one or more example embodiments, the hardware processor 221 executes software instructions stored in memory 243. The memory 243 includes one or more cache memories, main memory, and/or any other suitable type of memory. The memory 243 is discretely located within the controller 224 relative to the hardware processor 221 according to some example embodiments. In certain configurations, the memory 243 can be integrated with the hardware processor 221. In certain example embodiments, the controller 224 does not include a hardware processor 221. In such a case, the controller 224 can include, as an example, one or more FPGAs, one or more IGBTs, and/or one or more ICs. Using FPGAs, IGBTs, ICs, and/or other similar devices known in the art allows the controller 224 (or portions thereof) to be programmable and function according to certain logic rules and thresholds without the use of a hardware processor. Alternatively, FPGAs, IGBTs, ICs, and/or similar devices can be used in conjunction with one or more hardware processors 221.

The transceiver 223 of the controller 224 can send and/or receive control and/or communication signals. Specifically, the transceiver 223 can be used to transfer data between the controller 224 and other components of the lighting circuit 200. The transceiver 223 can use wired and/or wireless technology. The transceiver 223 can be configured in such a way that the control and/or communication signals sent and/or received by the transceiver 223 can be received and/or sent by another transceiver that is part of another component of the lighting circuit 200.

When the transceiver 223 uses wireless technology, any type of wireless technology can be used by the transceiver 223 in sending and receiving signals. Such wireless technology can include, but is not limited to, Wi-Fi, visible light communication, cellular networking, and Bluetooth. The transceiver 223 can use one or more of any number of suitable communication protocols (e.g., ISA100, HART) when sending and/or receiving signals. Such communication protocols can be dictated by the communication module 285. Further, any transceiver information for other components in the system can be stored in the storage repository 274.

Optionally, in one or more example embodiments, the security module 228 secures interactions between the controller 224 and other components of the system. More specifically, the security module 228 authenticates communication from software based on security keys verifying the identity of the source of the communication. For example, user software may be associated with a security key enabling the software of a user to interact with the controller 224. Further, the security module 228 can restrict receipt of information, requests for information, and/or access to information in some example embodiments.

As stated above, the configuration of the various light source arrays within a light module of a lighting circuit can vary. In addition, or in the alternative, any additional components (e.g., switches) of a lighting circuit can have different configurations. Further, example energy storage units can be coupled to the light module (or portions thereof) in various ways. FIGS. 3-6 show different examples of how example lighting circuits can be configured. Unless discussed specifically below, any portion of a lighting circuit in FIGS. 3-6 not discussed below is substantially similar to the corresponding portion described above with respect to the lighting circuit 200 of FIG. 2A.

Figure 3:
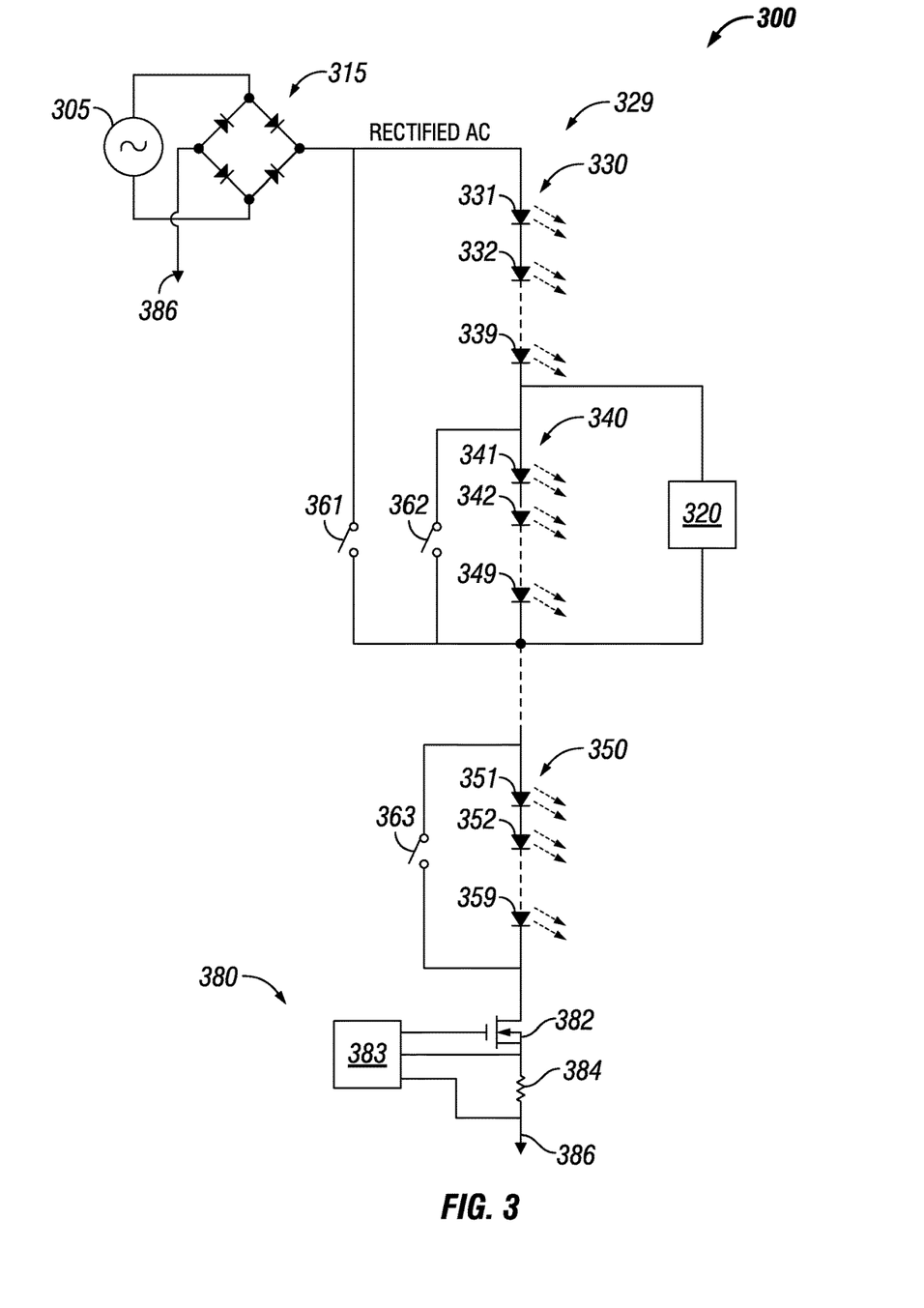
FIGS. 3-6 each shows a lighting circuit in accordance with one or more example embodiments.

FIG. 3 shows a lighting circuit 300 where the light module 329 has three light source arrays (light source array 330, light source array 340, and light source array 350) coupled in series. Light source array 330 includes light source 331, light source 332, and light source 339, which are coupled in series. Light source array 340 includes light source 341, light source 342, and light source 349, which are coupled in series. Light source array 350 includes light source 351, light source 352, and light source 359, which are coupled in series. Unlike the lighting circuit 200 of FIG. 2, the lighting circuit 300 of FIG. 3 does not include any diodes or capacitors.

There are three switches in the lighting circuit 300 of FIG. 3. Switch 361 is coupled in parallel with light source array 330 and light source array 340. Switch 362 is coupled in parallel with light source array 340. Switch 363 is coupled in parallel with light source array 350. Energy storage unit 320 is coupled in parallel with light source array 340. In this case, energy storage unit 320 of the lighting circuit 300 of FIG. 3 is substantially similar to the energy storage unit 220 described above with respect to FIG. 2.

Figure 4:
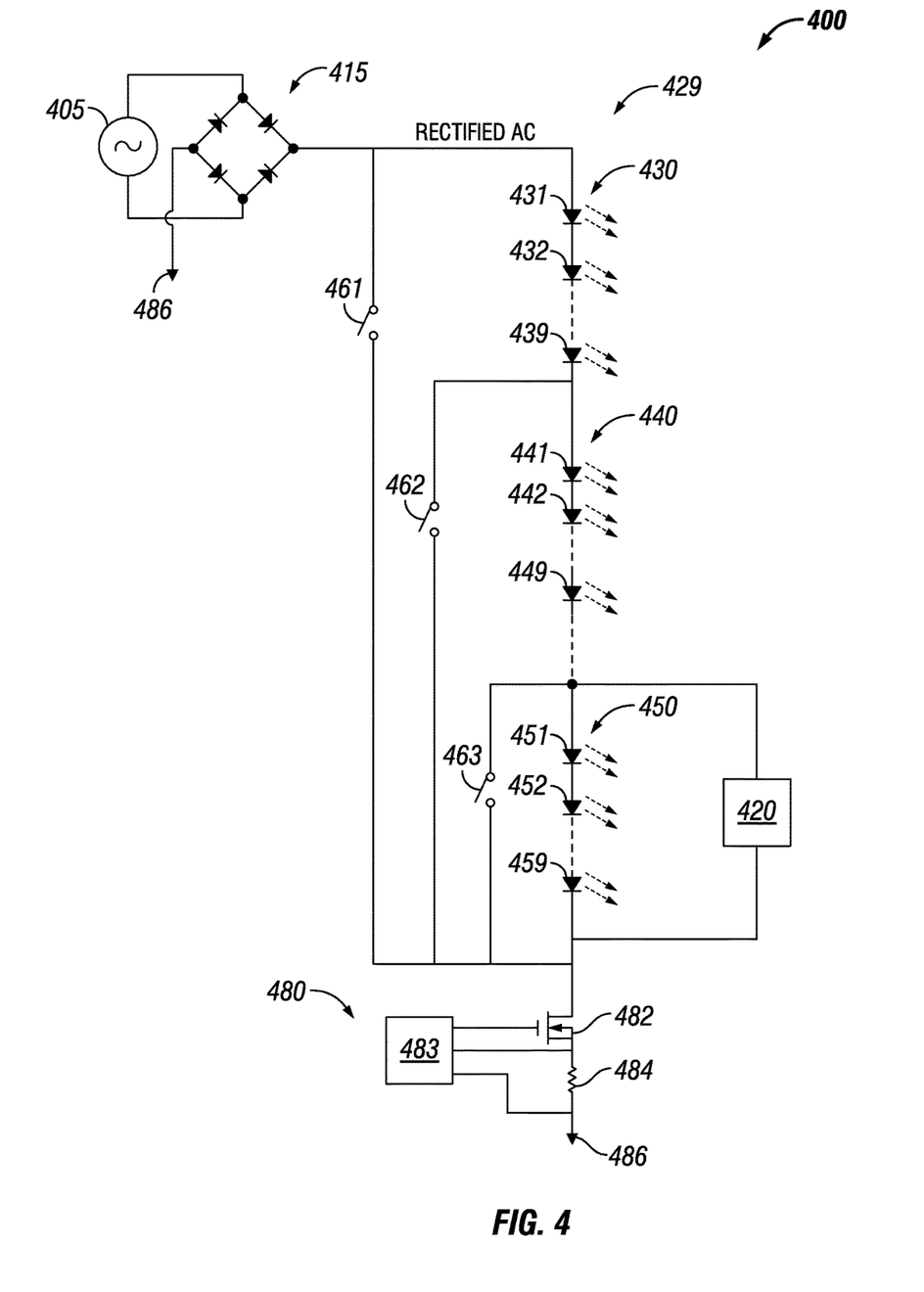

FIG. 4 shows a lighting circuit 400 where the light module 429 has three light source arrays (light source array 430, light source array 440, and light source array 450) coupled in series. Light source array 430 includes light source 431, light source 432, and light source 439, which are coupled in series. Light source array 440 includes light source 441, light source 442, and light source 449, which are coupled in series. Light source array 450 includes light source 451, light source 452, and light source 459, which are coupled in series. As with the lighting circuit 300 of FIG. 3, the lighting circuit 400 of FIG. 4 does not include any diodes or capacitors.

There are three switches in the lighting circuit 400 of FIG. 4. Switch 461 is coupled in parallel with light source array 430, light source array 440, and light source array 450. Switch 462 is coupled in parallel with light source array 440 and light source array 450. Switch 463 is coupled in parallel with light source array 450. Energy storage unit 420 is coupled in parallel with light source array 450. In this case, energy storage unit 420 of the lighting circuit 400 of FIG. 4 is substantially similar to the energy storage unit 220 described above with respect to FIG. 2.

Figure 5:
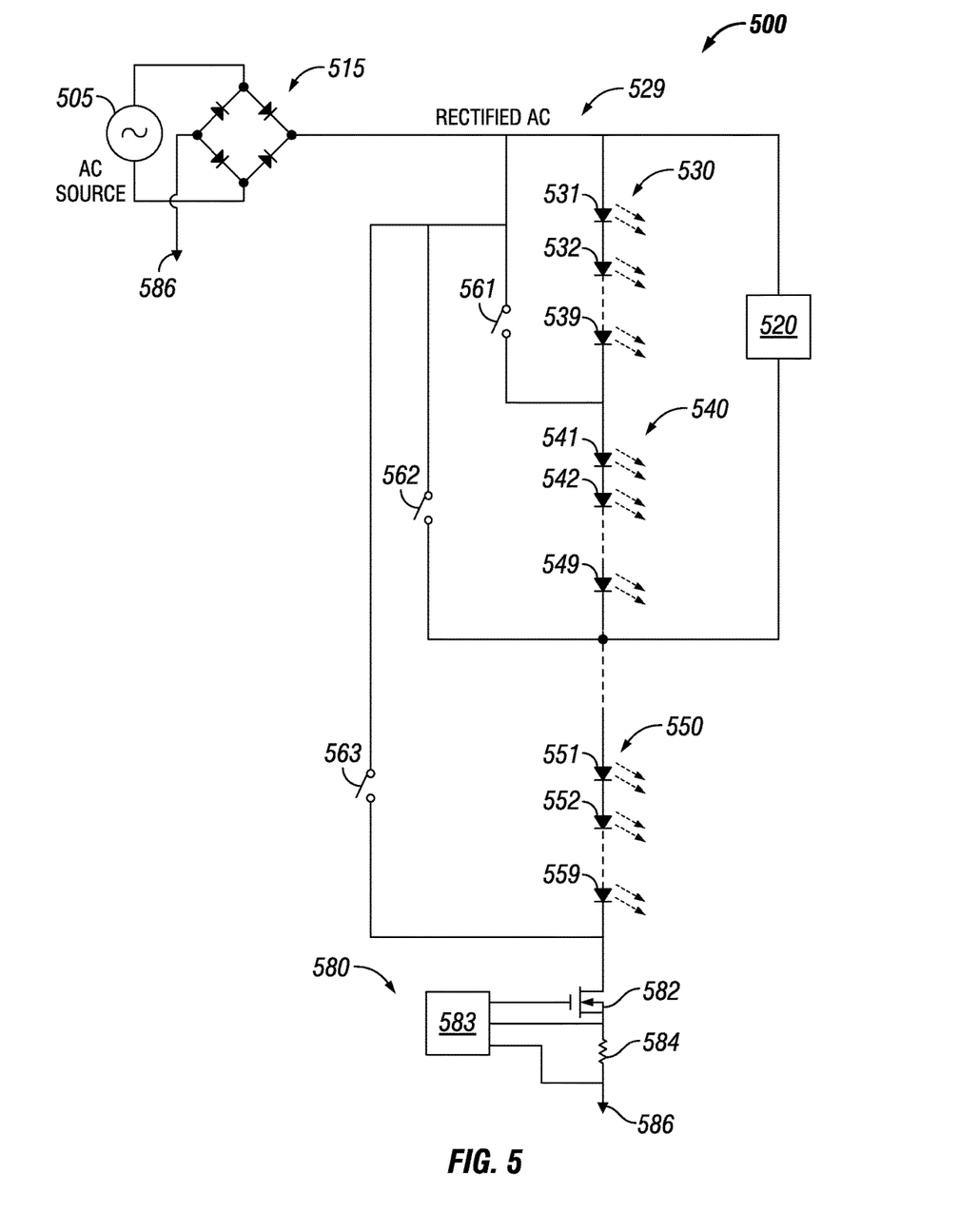

FIG. 5 shows a lighting circuit 500 where the light module 529 has three light source arrays (light source array 530, light source array 540, and light source array 550) coupled in series. Light source array 530 includes light source 531, light source 532, and light source 539, which are coupled in series. Light source array 540 includes light source 541, light source 542, and light source 549, which are coupled in series. Light source array 550 includes light source 551, light source 552, and light source 559, which are coupled in series. As with the lighting circuit 300 of FIG. 3, the lighting circuit 500 of FIG. 5 does not include any diodes or capacitors.

There are three switches in the lighting circuit 500 of FIG. 5. Switch 563 is coupled in parallel with light source array 530, light source array 540, and light source array 550. Switch 562 is coupled in parallel with light source array 530 and light source array 540. Switch 561 is coupled in parallel with light source array 530. Energy storage unit 520 is coupled in parallel with light source array 530 and light source array 540. In this case, energy storage unit 520 of the lighting circuit 500 of FIG. 5 is substantially similar to the energy storage unit 220 described above with respect to FIG. 2.

FIG. 6 shows a lighting circuit 600 where the light module 629 has three light source arrays (light source array 630, light source array 640, and light source array 650) coupled in series. Light source array 630 includes light source 631, light source 632, light source 633, and light source 639, which are coupled in series. Light source array 640 includes light source 641 and light source 649, which are coupled in series. Light source array 650 includes light source 221.

As with the lighting circuit 200 of FIG. 2, the lighting circuit 600 of FIG. 6 includes three diodes or capacitors coupled in series and in parallel, respectively, with respect to each of the three light source arrays. There are three switches in the lighting circuit 600 of FIG. 6. Switch 661 is coupled in parallel with light source array 630. Switch 662 is coupled in parallel with light source array 540. Switch 663 is coupled in parallel with light source array 650.

The energy storage unit 620 of FIG. 6 has two controllers 624 (in this example, controller 624-1 and controller 624-2), where each controller 624 includes a single uni-directional DC-to-DC converter (or, alternatively, a single controller having two different DC-to-DC converters). Controller 624-1 of the energy storage unit 620 is coupled in parallel with light source array 640. Controller 624-1 receives the primary power provided by the rectifier 615, converts the primary power in a DC-to-DC converter (e.g., similar to DC-DC converter 291 of FIG. 2A), and sends the converted primary power to the one or more energy storage devices 622. Controller 624-2 of the energy storage unit 620 is coupled in parallel with light source 639 of light source array 630, all of light source array 640, and all of light source array 650. Controller 624-2 releases the reserve power stored in the energy storage devices 622, converts the reserve power using a DC-to-DC converter (e.g., similar to the boost converter 292 of FIG. 2A), and sends the converted reserve power to light source 639 of light source array 630, one or more of the light sources of light source array 640, and/or light source 651 of light source array 650.

In other words, the energy storage devices 622 are charged from one part of the light module 629, and the reserve power released by the energy storage devices 622 are delivered to another part of the light module 629. As a result, two different DC-to-DC converters are used, one for each controller 624. Otherwise, the sensor device 626 and the energy storage devices 622 of the energy storage unit 620 of the lighting circuit 600 of FIG. 6 are substantially similar to the sensor device 226 and the energy storage devices 222 of the energy storage unit 220 described above with respect to FIG. 2A.

Figure 7:
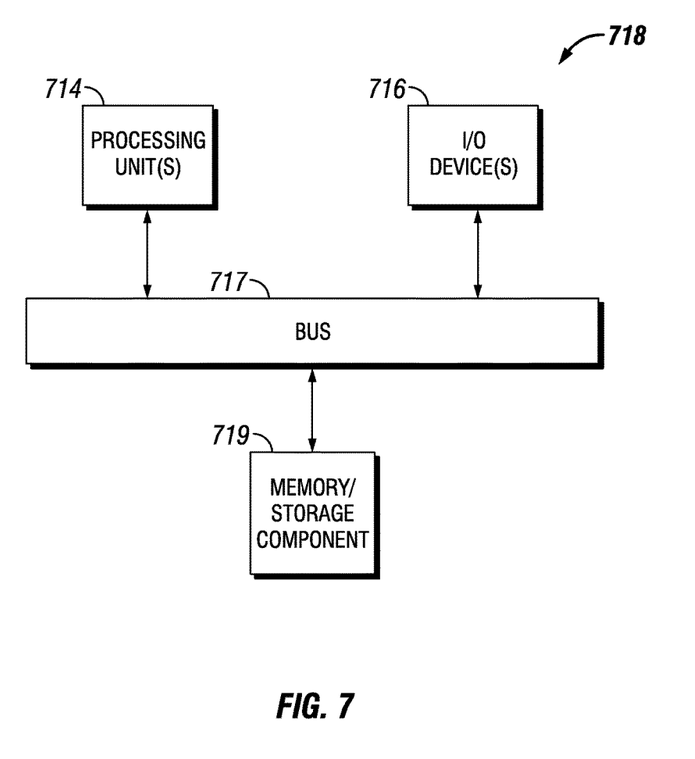
FIG. 7 shows a computing device in accordance with certain example embodiments.

As discussed above, one or more of the functions performed by any of the components (e.g., controller 224) of an example system described herein can be performed using a computing device 718. An example of a computing device 718 is shown in FIG. 5. The computing device 718 implements one or more of the various techniques described herein, and which is representative, in whole or in part, of the elements described herein pursuant to certain example embodiments. Computing device 718 is one example of a computing device and is not intended to suggest any limitation as to scope of use or functionality of the computing device and/or its possible architectures. Neither should computing device 718 be interpreted as having any dependency or requirement relating to any one or combination of components illustrated in the example computing device 718.

Computing device 718 includes one or more processors or processing units 714, one or more memory/storage components 719, one or more input/output (I/O) devices 716, and a bus 717 that allows the various components and devices to communicate with one another. Bus 717 represents one or more of any of several types of bus structures, including a memory bus or memory controller, a peripheral bus, an accelerated graphics port, and a processor or local bus using any of a variety of bus architectures. Bus 717 includes wired and/or wireless buses.

Memory/storage component 719 represents one or more computer storage media. Memory/storage component 719 includes volatile media (such as random access memory (RAM)) and/or nonvolatile media (such as read only memory (ROM), flash memory, optical disks, magnetic disks, and so forth). Memory/storage component 719 includes fixed media (e.g., RAM, ROM, a fixed hard drive, etc.) as well as removable media (e.g., a Flash memory drive, a removable hard drive, an optical disk, and so forth).

One or more I/O devices 716 allow a customer, utility, or other user to enter commands and information to computing device 718, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 718 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 718 includes at least the minimal processing, input, and/or output means necessary to practice one or more embodiments.

Further, those skilled in the art will appreciate that one or more elements of the aforementioned computer device 718 is located at a remote location and connected to the other elements over a network in certain example embodiments. Further, one or more embodiments is implemented on a distributed system having one or more nodes, where each portion of the implementation (e.g., controller 224) is located on a different node within the distributed system. In one or more embodiments, the node corresponds to a computer system. Alternatively, the node corresponds to a processor with associated physical memory in some example embodiments. The node can also corresponds to a processor with shared memory and/or resources in some example embodiments.

In one or more example embodiments, the example lighting circuits described herein have energy storage units whose energy storage devices charge using primary power provided by a rectifier as opposed to a power source as currently used in the art. Example embodiments can be used to increase the utilization of energy storage units, both from the standpoint of charging energy storage devices within an energy storage unit and from the standpoint of efficiently distributing the reserve power from the energy storage unit.

Example embodiments also allow for increased flexibility in the use of light sources within a light fixture. Such flexibility can lead to enhanced reliability and safety for users. Further, example embodiments eliminate the need for an energy transfer device (e.g., an AC-to-DC converter), which reduces materials and costs. The lack of an AC-to-DC converter also allows example embodiments to operate in applications having higher temperatures. Further, the lack of an AC-to-DC converter reduces the physical profile of a lighting fixture, which allows for more aesthetically pleasing and/or streamlined designs.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the present invention is not limited herein.

What is claimed is:

1. An electrical circuit for a light fixture, the electrical circuit comprising:
   a power supply that provides primary power, wherein the power supply comprises a rectifier;
   a light module comprising at least one first light source and coupled to the power supply, wherein the at least one first light source illuminates when the light module receives the primary power; and
   an energy storage unit comprising at least one energy storage device, wherein the energy storage unit and the at least one first light source, coupled in parallel with each other, are coupled in series with the power supply, wherein the at least one energy storage device charges using the primary power,
   wherein the at least one first light source receives reserve power from the energy storage unit when the power supply ceases providing the primary power.

2. The electrical circuit of claim 1, wherein the energy storage unit further comprises a sensor device, wherein the sensor device detects when the power supply ceases providing the primary power.

3. The electrical circuit of claim 2, wherein the sensor device detects an amount of primary power flowing to the at least one first light source.

4. The electrical circuit of claim 2, wherein the sensor device detects an amount of light emitted by the at least one first light source.

5. The electrical circuit of claim 2, wherein the energy storage unit further comprises at least one controller coupled to the sensor device and the energy storage device, wherein the at least one controller releases the reserve power from the at least one energy storage device when the sensor device detects that the power supply ceases providing the primary power.

6. The electrical circuit of claim 5, wherein the energy storage unit further comprises at least one switch controlled by the at least one controller, wherein the at least one switch regulates the flow of the primary power and the reserve power into and out of the energy storage unit.

7. The electrical circuit of claim 5, wherein the light module further comprises at least one second light source coupled to the at least one first light source, wherein the at least one second light source is illuminated by the primary power delivered by the power supply.

8. The electrical circuit of claim 7, wherein the at least one controller directs the reserve power from the at least one energy storage device to the at least one first light source without directing the reserve power from the at least one energy storage device to the at least one second light source.

9. The electrical circuit of claim 7, wherein the at least one controller directs the reserve power from the at least one energy storage device to the at least one first light source and the at least one second light source.

10. The electrical circuit of claim 7, wherein the at least one first light source and the at least one second light source are connected in series with respect to each other.

11. The electrical circuit of claim 7, wherein the at least one first light source and the at least one second light source are connected in parallel with respect to each other.

12. The electrical circuit of claim 2, wherein the energy storage unit further comprises at least one controller coupled to the sensor device and the at least one energy storage device, wherein the at least one controller controls the primary power delivered to the at least one energy storage device.

13. The electrical circuit of claim 1, wherein the at least one first light source comprises at least one light-emitting diode (LED).

14. The electrical circuit of claim 1, wherein the at least one first light source is among a first array of light sources.

15. The electrical circuit of claim 1, wherein the primary power is direct current (DC) power.

16. The electrical circuit of claim 15, wherein the reserve power is DC power.

17. The electrical circuit of claim 16, wherein the energy storage unit further comprises at least one DC-to-DC converter disposed between the at least one energy storage device and the light module.

18. The electrical circuit of claim 17, wherein the at least one DC-to-DC converter comprises a DC-DC converter disposed between the light module and the at least one energy storage device, wherein the DC-DC converter manipulates the primary power for storage by the at least one energy storage device.

19. The electrical circuit of claim 17, wherein the at least one DC-to-DC converter comprises a boost converter disposed between the at least one energy storage device and the light module, wherein the boost converter manipulates the reserve power for use by the light module.

20. A lighting circuit, comprising:
a power source that provides main power;
a driving circuit coupled to the power source, wherein the driving circuit receives the main power and produces primary power, wherein the driving circuit comprises a rectifier;
at least one light source array coupled to the driving circuit, wherein the at least one light source array comprises at least one first light source that illuminates using the primary power received from the driving circuit; and
an energy storage unit electrically coupled in parallel to the at least one light source array, wherein the energy storage unit, along with the at least one light source array, is coupled in series with the driving circuit, wherein the energy storage unit comprises at least one energy storage device, wherein the at least one energy storage device charges using the primary power,
wherein the at least one light source array receives reserve power from the energy storage unit when the driving circuit ceases providing the primary power.

* * * * *